(No Model.)
E. R. DAY & C. H. COLT.
BALL TRAP AND TARGET.
No. 389,741. Patented Sept. 18, 1888.
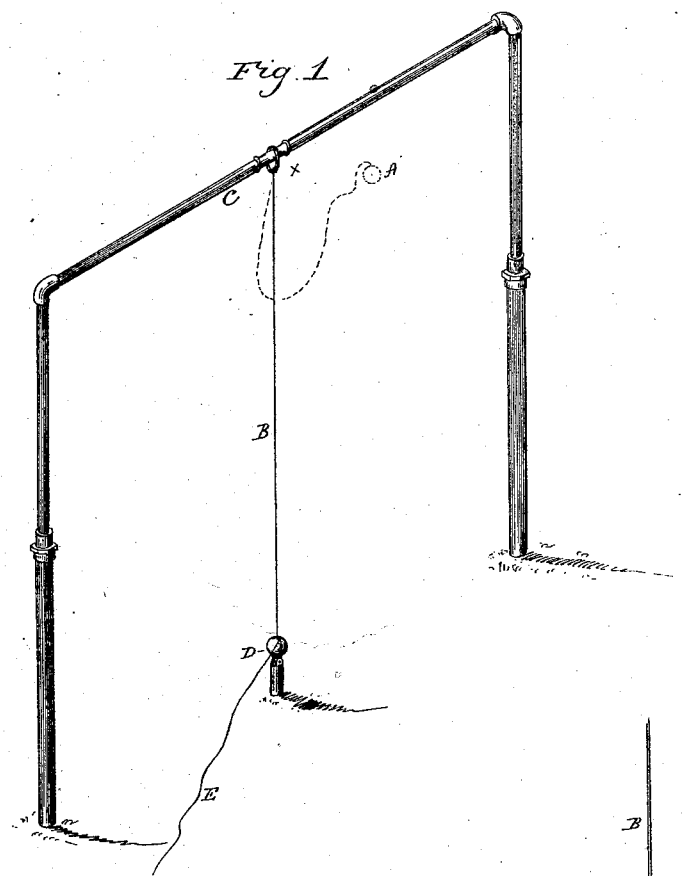
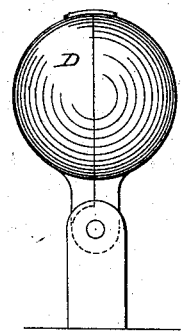 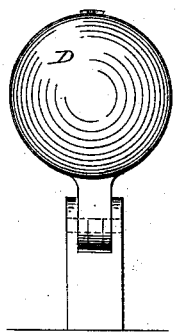 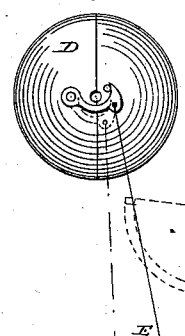 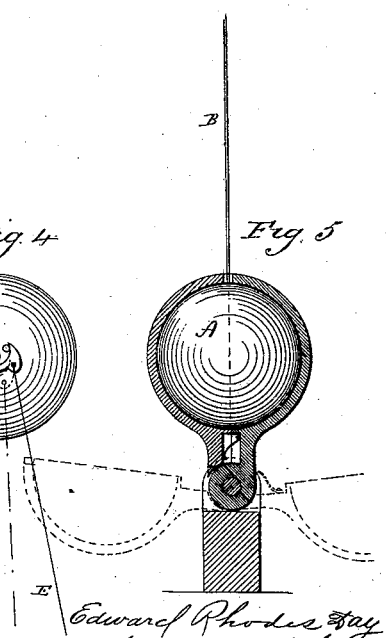

UNITED STATES PATENT OFFICE.

EDWARD RHODES DAY, OF LONDON, ENGLAND, AND CALDWELL HART COLT, OF HARTFORD, CONNECTICUT; SAID DAY ASSIGNOR TO SAID COLT.

BALL TRAP AND TARGET.

SPECIFICATION forming part of Letters Patent No. 389,741, dated September 18, 1888.

Application filed July 2, 1888. Serial No. 278,726. (No model.)

*To all whom it may concern:*

Be it known that we, EDWARD RHODES DAY, a subject of Her Majesty the Queen of Great Britain, residing at No. 96 Piccadilly, London, England, and CALDWELL HART COLT, a citizen of the United States, residing at Hartford, in the State of Connecticut, but temporarily of Hurlingham Field House, Hurlingham, in the county of Middlesex, England, have invented a new and useful Improvement in and connected with Artificial Birds for Shooting Practice, of which the following is a specification, in connection with the accompanying drawings, in which—

Figure 1 represents a perspective view of the apparatus as in use; Fig. 2, a side view of the trap, looking in line with the axis; Fig. 3, a side view at right angles to Fig. 2; Fig. 4, a top view of the trap; Fig. 5, a vertical central section of the trap cutting at right angles to the axis of the hinge.

The invention relates to the arrangement of substitutes for the live birds usually employed in shooting matches or practice.

The invention consists of the improved arrangement and combination of parts hereinafter described, whereby a rising flight may be obtained more closely allied to the flight of a real bird than that obtained by the spring-traps and similar devices now generally employed in connection with the throwing of glass balls and clay pigeons.

To clearly explain our invention reference is made to the accompanying drawings, which form part of this specification.

The "bird" A is constructed of suitable light material, preferably in a manner and of a substance analogous to that of the toy balloons now sold, and being, like them, filled with sufficient gas or air to properly inflate the same. To the bird A so constructed is attached a suitable length of elastic cord, B, the other end of which is fastened to a bar or post, C, at the approximate limit X of the intended flight. The elastic cord B is then distended to nearly the limit of its elasticity and the bird is placed in the trap D. When said trap is opened—say by the cord E—the contraction of the elastic cord B draws the bird A rapidly toward the limit X, the bird A slightly rising in a manner analogous to the flight of a pigeon.

Any number of elastic cords, birds, and traps may of course be used.

What we claim, and desire to secure by Letters Patent, is—

In an apparatus for practice shooting, the combination of an elastic cord, B, a stationary support to which one end of said elastic cord is attached, a stationary trap below said stationary support for the cord and distant therefrom greater than the normal length of the cord, and an artificial bird attached to the free end of said cord, said trap being adapted to receive and hold said artificial bird under the extension of said cord, the said trap provided with a catch by means of which said artificial bird may be released, substantially as specified, and whereby upon the opening of the said trap the said elastic cord will cause the said bird to fly from the trap.

In testimony whereof we have hereunto set our hands in the presence of the two subscribing witnesses.

EDWARD RHODES DAY.
    CALDWELL HART COLT.

Witnesses:
 H. VALLANCE,
 *Solicitor to Lombard House, London, E. C.*
 ROBERT CATHAN.